(12) United States Patent
Hundsdorf et al.

(10) Patent No.: US 8,329,369 B2
(45) Date of Patent: Dec. 11, 2012

(54) METHOD FOR THE PRODUCTION OF PURE C.I. PIGMENT ORANGE 74

(75) Inventors: Thomas Hundsdorf, Weiterstadt (DE); Willi Rauschmann, Frankfurt am Main (DE)

(73) Assignee: Clariant Finance (BVI) Limited, Tortola (VG)

( * ) Notice: Subject to any disclaimer, the term of this patent is extended or adjusted under 35 U.S.C. 154(b) by 520 days.

(21) Appl. No.: 12/663,637

(22) PCT Filed: May 21, 2008

(86) PCT No.: PCT/EP2008/004043
§ 371 (c)(1),
(2), (4) Date: Dec. 8, 2009

(87) PCT Pub. No.: WO2009/000375
PCT Pub. Date: Dec. 31, 2008

(65) Prior Publication Data
US 2010/0178607 A1    Jul. 15, 2010

(30) Foreign Application Priority Data
Jun. 22, 2007 (DE) .......................... 10 2007 028 871

(51) Int. Cl.
*G03G 9/09* (2006.01)
*C09B 67/54* (2006.01)
*C09D 7/12* (2006.01)

(52) U.S. Cl. ................... 430/108.23; 524/190; 534/864

(58) Field of Classification Search ................. 524/190; 534/864; 430/108.23
See application file for complete search history.

(56) References Cited

U.S. PATENT DOCUMENTS

| | | | |
|---|---|---|---|
| 4,124,582 A | 11/1978 | Ribka et al. | |
| 4,459,233 A | 7/1984 | Fabian et al. | |
| 4,623,397 A * | 11/1986 | Kaul | 106/496 |
| 4,879,373 A | 11/1989 | Kaul | |
| 7,147,703 B2 | 12/2006 | Ganschow et al. | |
| 2006/0060111 A1* | 3/2006 | Ganschow et al. | 106/493 |
| 2007/0213516 A1* | 9/2007 | Hoellein et al. | 534/887 |
| 2007/0215007 A1 | 9/2007 | Mehltretter et al. | |

FOREIGN PATENT DOCUMENTS

| | | |
|---|---|---|
| CH | 653048 | 12/1985 |
| DE | 2302517 | 8/1974 |
| DE | 3114928 | 10/1982 |
| DE | 102004045389 | 3/2006 |
| GB | 2104911 | 3/1983 |
| JP | 61-233062 | 10/1986 |
| WO | WO 2005/105927 | 11/2005 |
| WO | WO 2005/111151 | 11/2005 |

OTHER PUBLICATIONS

PCT International Search Report for PCT/EP2008/004043, mailed Apr. 3, 2009.
English Translation of PCT International Report on Patentability for PCT/EP2008004043, mailed Jan. 21, 2010.
English Abstract for JP 61-233062, Oct. 17, 1986.

* cited by examiner

*Primary Examiner* — Hoa V Le
(74) *Attorney, Agent, or Firm* — Anthony A. Bisulca

(57) ABSTRACT

The invention relates to a method for conditioning and purifying pigment orange 74. The method is characterized in that the aqueous suspension of the raw pigment, optionally after adding an organic solvent from the group comprising isobutanol, chlorobenzene and o-dichlorobenzene, is subjected to a finishing treatment, the organic solvent is optionally removed using a distillation process, the remaining aqueous pigment suspension is mixed with a non-ionic surfactant and is heated to a temperature ranging from 30 to 100° C. and the pigment is then filtered off.

14 Claims, No Drawings

METHOD FOR THE PRODUCTION OF PURE C.I. PIGMENT ORANGE 74

The present invention resides in the field of azo pigments. It is known that certain azo pigments, usually those from the group of the Naphtol AS and benzimidazolone pigments, precipitate from their as-synthesized solution in small insoluble particles (primary crystallites) which require a conditioning aftertreatment. These are known as conditioned azo pigments to a person skilled in the art. The conditioning treatment changes physical properties, such as crystal shape, crystal size and crystal quality, and also particle size distribution toward a desired optimum. This is because, if a crude pigment presscake is dried directly after synthesis and washing, the primary particles often tend to form agglomerates and aggregates. This leads to harsh-textured pigments which are weak in color and difficult to disperse in that they are often no longer convertible into a useful pigmentary form even by milling or grinding.

Pigment conditioning usually takes the form of a thermal aftertreatment in which the crude pigment suspension, or the pigment presscake after it has been washed salt-free, isolated and pasted up again, is heated in water and/or organic solvents to improve crystal formation. In the process, the ultrafine fraction, which is particularly responsible for the agglomeration tendency of the pigments, is reduced and consequently a narrower particle size distribution is achieved. Particularly sparingly soluble pigments are aftertreated in organic solvents at temperatures of 80 to 150° C. Organic solvents used for this purpose include, for example, alcohols, glacial acetic acid, chlorobenzene, o-dichlorobenzene and dimethylformamide.

Conditioned azo pigments of high chemical and optical purity have hitherto usually been conditioned in dimethylformamide or N-methylpyrrolidone. This method of conditioning usually leads to the desired good coloristic properties and provides the azo pigment in a quality which is substantially free of impurities, since filtration is done directly from the organic solvent, in which chemical impurities are readily soluble. The subsequent recovery of the solvent by distillation is not particularly cost-effective and, in the case of dimethylformamide in particular, not generally recognized as safe by ecotoxicologists, since the distillation sump with the impurity residues can be disposed of only by incineration.

Sometimes, pigment conditioning can also be effected in other organic solvents, for example alcohols, chlorobenzene or o-dichlorobenzene. Conditioning with these solvents is done within a solvent-water mixture in which the proportion of water is in the range from 1% to 90%, preferably 10-80%. Removing the solvent by distillation is more cost-effective since recovery—as in the case of dimethylformamide—does not have to be accomplished separately but can take place directly in the processing step. The disadvantage of these alternative methods is that impurities remain behind in the aqueous pigment suspension (sump) and deposit on the surface of the pigment. This usually leads to reduced chemical and optical purity for the pigment.

DE 23 02 517 A1 describes the use of alkaline media for purifying azo pigments.

DE 31 14 928 A1 describes a process for purifying crude organic pigments wherein the pigment is suspended in a mixture of two mutually immiscible organic liquids and then the liquid containing the impurities is separated off.

JP 61-233062 describes a process for purifying azo dyes by using NaOH, nitrobenzene and a surface-active substance.

CH 653 048 A5 describes a conditioning treatment in dimethylformamide.

C.I. Pigment Orange 74 of formula (I) is a member of the above-described group of conditioned azo pigments and has immense industrial importance in the coatings art in particular.

It is an object of the present invention to provide a suitable process for preparing pure C.I. Pigment Orange 74 of formula (I) in a way which in terms of safety, environmental compatibility and use of resources, is superior to the hitherto customary solvent-based conditioning operation and yet, at the same time, ensures high purity for this pigment.

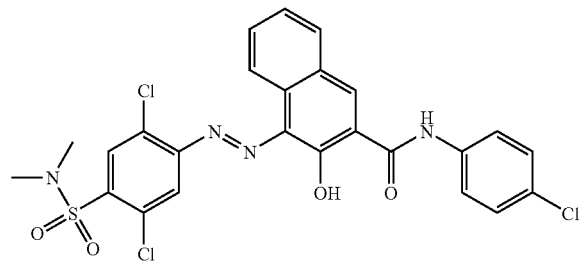

(I)

The present invention provides a process for preparing pure C.I. Pigment Orange 74, which comprises subjecting an aqueous suspension of crude C.I. Pigment Orange 74 pigment, optionally after addition of one or more organic solvents from the group consisting of isobutanol, chlorobenzene and o-dichlorobenzene, to a conditioning treatment, removing any organic solvent by distillation, and admixing the remaining aqueous pigment suspension with a nonionic surfactant, bringing the admixture to a temperature of 30 to 100° C. and then filtering off the pigment.

The conditioning treatment of the present invention is conveniently carried out in a heatable reaction vessel equipped with stirring means. The preferred temperature range for the conditioning treatment is between 30 and 200° C., particularly between 80 and 200° C.

A conditioning treatment in water is preferably carried out under superatmospheric pressure and at temperatures of 100 to 200° C.

It may be advantageous to add additional amounts of water or organic solvent during the conditioning treatment. The proportion of liquid medium (water and organic solvent) may be in the range from 80% to 99% by weight and preferably in the range from 85% to 95% by weight, based on the total amount of pigment suspension.

The duration of the conditioning treatment can vary within wide limits in that 10 minutes to 10 hours are preferable and 30 minutes to 5 hours are more preferable.

After the conditioning treatment has ended, the organic solvent, if present, is advantageously removed by a steam distillation.

Subsequently, the aqueous pigment suspension is admixed with a nonionic surfactant, preferably in an amount of 5% to 100% by weight, more preferably 7.5% to 50% by weight and even more preferably 10% to 30% by weight, based on the weight of the pigment.

The mixture is brought to a temperature of 30 to 100° C., preferably 50 to 90° C., and maintained at that temperature for a period which is preferably in the range from 5 min to 5 hours and more preferably in the range from 10 min to 2 hours, preferably while stirring or shaking. A longer treatment with the nonionic surfactant is possible, as will be appreciated, but does not yield any technical advantages. Thereafter, the pigment is filtered off.

Useful nonionic surfactants include, for example, fatty amine carboxyglycinates, amine oxides, fatty alcohol polyglycol ethers, fatty acid polyglycol esters, betaines, such as fatty acid amide N-propylbetaines, phosphoric esters of aliphatic and aromatic alcohols, fatty alcohols or fatty alcohol polyglycol ethers, fatty acid amide ethoxylates, fatty alcohol-alkylene oxide adducts and alkylphenol polyglycol ethers. Fatty alcohol polyglycol ethers are particularly preferred.

The nonionic surfactant binds the chemical impurities such that, following the subsequent thermal treatment, they end up in the filtrate and not on the pigment.

It has further been determined that the C.I. Pigment Orange 74 treated by following the process of the present invention surprisingly even has a higher quality with regard to purity, hue, color strength and color cleanness than after conventional conditioning in dimethylformamide or N-methylpyrrolidone.

The present invention accordingly also provides a C.I. Pigment Orange 74 prepared by following the process of the present invention. More particularly, the novel C.I. Pigment Orange 74 is characterized by an optical purity $C^*$ (expressed in absolute purity in an alkyd-melamine varnish) of at least 43.00. More particularly, the novel C.I. Pigment Orange 74 is also characterized by an absolute hue angle $H^*$ of at least 29.00 in an alkyd-melamine varnish. More particularly, the novel C.I. Pigment Orange 74 is also characterized by an absolute lightness $L^*$ of at least 73.60 in an alkyd-melamine varnish.

The C.I. Pigment Orange 74 of the present invention is useful for pigmenting high molecular weight organic materials of natural or synthetic origin, for example varnishes and paints, electrophotographic toners and developers and inkjet inks, particularly varnishes.

Examples follow; parts are by weight.
Preparation of Alkyd-Melamine Varnishes:

AM5 masstone varnish (8%): 22.8 parts of an AM5 grind varnish (50% of Vialkyd AC 451 n/70SNB (UCB Resins and Additives), 50% of solvent naphtha, 1e) and 7.2 parts of pigment are dispersed in a shaking machine with addition of glass beads. After dispersion, 30 parts of the millbase (grind varnish+pigment) are mixed with 60 parts of a letdown mix [26.4% of Vialkyd AC451n/70SNB (UCB Resins and Additives), 29.4% of Vialkyd AC451/60SNA (UCB Resins and Additives), 35.8% of Maprenal MF600/55BIB (UCB Resins and Additives), 6.2% of AM5 high-boiler mix (35% of n-butanol, 35% of Depanol I, 30% of butyl diglycol), 2.2% of solvent naphtha, 1e].

AM5 reduction (1:20): 4.5 parts of AM5 masstone varnish and 24 parts of AM5 white varnish [52.6% of white paste (Standox GmbH, Article 256013), 24.1% of Vialkyd AC451/60SNA (UCB Resins and Additives), 15.2% of Maprenal MF600/55BIB (UCB Resins and Additives), 0.7% of BYK-331, 1% in solvent naphtha, 1e, 0.7% of butyl diglycol, 1.4% of diacetone alcohol, 2.8% of Depanol I, 2.5% of solvent naphtha, 1e] until homogeneous.

The masstone varnish and the reduction are drawn down on test cards. Transparency is determined visually over black ground. Chroma, hue angle and lightness are measured in the reduction as absolute values (SF 750 spectrophotometer, d8 geometry).

EXAMPLE 1

(Comparison)

Pigment Orange 74 is synthesized similarly to the general example recited in CH-A-653 048 with regard to diazo solution, coupling component and coupling using the reaction components reported in No. 7 of the tables recited in that patent specification. The dried crude pigment is in accordance with CH-A-653 048 conditioned in pure DMF, filtered and subsequently dried to obtain a pigment powder of intensively orange hue (recited as No. 8 in the table of CH-A-653 048).

Values measured in AM5 reduction (1:20):
absolute chroma $C^*$=42.74, absolute hue angle $H^*$=28.42, absolute lightness $L^*$=73.44.

EXAMPLE 2 a) Diazo Solution 40.4 parts of 1-amino-2,5-dichlorobenzene-4-sulfonic dimethylamide are gradually introduced into 145 parts of water with stirring, the mixture is subsequently stirred for 2 h, 157 parts of 31 percent hydrochloric acid are added, and the mixture is subsequently stirred for 6 h. The mixture is cooled down to −5° C. with 260 parts of ice, admixed with 20.8 parts of 40 percent sodium nitrite solution, subsequently stirred at max. 5° C. for 1 hour, 3.8 parts of filter earth are added, and the excess sodium nitrite is removed with a small amount of sulfamic acid.

b) Coupling Component 46 parts of 2-hydroxy-3-naphthoic 4'-chlorophenylamide are dissolved in 115 parts of water, 83.5 parts of a commercially available nonionic surfactant (liquid) and 26 parts of 33 percent aqueous sodium hydroxide solution by stirring, 3.8 parts of filter earth are added to the solution, and the solution of the coupling component is added over 15 min with clarification into a solution of 285 parts of water, 48 parts of 80 percent acetic acid, 7 parts of a nonionic polyglycol ether, 14 parts of a nonionic polyether and 50 parts of ice. The mixture is subsequently stirred for 3-5 min, admixed with a further 7 parts of the nonionic polyglycol ether and adjusted to a temperature of 20° C. for the coupling reaction.

c) Coupling

The diazo solution prepared under a) is added over 3 hours to the precipitated coupling component from b). Subsequently, the batch is filtered off and washed with 10 000 parts of water. The pigment formed is reddish orange and is further processed as presscake.

d) Aftertreatment in Chlorobenzene/Water

The pigment presscake (about 400 parts) from c) is subsequently treated in an autoclave in a mixture of chlorobenzene/water at 90° C. for about 1 hour. After cooling to 30° C., the suspension is introduced into a round-bottom flask and the chlorobenzene is distilled off over 2 h via a steam distillation. Then, 4 parts of a fatty alcohol polyglycol ether are added and the mixture is stirred at 85° C. for 30 min. The suspension is subsequently filtered and the pigment presscake is washed, dried and ground. An orange hue is obtained.

Values measured in AM5 reduction (1:20):
absolute chroma $C^*$=43.09, absolute hue angle $H^*$=29.14, absolute lightness $L^*$=73.79.

TABLE

Absolute colorimetric values for AM5 reduction (absolute angle reported):

| Example No. | Absolute chroma $C^*$ | Absolute hue angle $H^*$ | Absolute lightness $L^*$ |
|---|---|---|---|
| 1 (comparison) | 42.74 | 28.42 | 73.44 |
| 2 | 43.09 | 29.14 | 73.79 |

AM5 masstone example 2 versus example 1 (comparison):
Relative lightness dL = 0.8,
Relative transparency dTra = 0.4.

We claim:

1. A process for preparing pure C.I. Pigment Orange 74, comprising the steps of subjecting an aqueous suspension of crude C.I. Pigment Orange 74 pigment, optionally after addition of one or more organic solvents selected from the group consisting of isobutanol, chlorobenzene and o-dichlorobenzene, to a conditioning treatment, removing any organic solvent by distillation, admixing the remaining aqueous pigment suspension with a nonionic surfactant, bringing the admixture to a temperature of 30 to 100° C. and filtering off the pigment.

2. The process as claimed in claim 1 wherein the conditioning treatment is carried out at a temperature between 30 and 200° C.

3. The process as claimed in claim 1, wherein the conditioning treatment is carried out at a temperature between 80 and 200° C.

4. The process as claimed in claim 1, wherein the conditioning treatment is carried out in water under superatmospheric pressure and at temperatures of 100 to 200° C.

5. The process as claimed in claim 1, wherein the conditioning treatment is carried out in o-dichlorobenzene.

6. The process as claimed in claim 1, wherein the amount of nonionic surfactant is in the range from 5% to 100% by weight, based on the weight of the pigment.

7. The process as claimed in claim 1, wherein the amount of nonionic surfactant is in the range from 10% to 30% by weight, based on the weight of the pigment.

8. The process as claimed in claim 1, wherein the aqueous pigment suspension is admixed with a nonionic surfactant and brought to a temperature of 50 to 90° C.

9. The process as claimed in claim 1, wherein the nonionic surfactant is a fatty alcohol polyglycol ether.

10. A C.I. Pigment Orange 74 made in accordance with the process of claim 1, wherein the optical purity C* is at least 43.00 in an alkyd-melamine varnish.

11. The C.I. Pigment Orange 74 as claimed in claim 10, wherein the absolute hue angle H* is at least 29.00 in an alkyd-melamine varnish.

12. The C.I. Pigment Orange 74 as claimed in claim 10, wherein the absolute lightness L* is at least 73.60 in an alkyd-melamine varnish.

13. A pigmented high molecular weight organic materials of natural or synthetic origin pigmented by the C.I. Pigment Orange as claimed in claim 10.

14. A composition pigmented by the C.I. Pigment Orange as claimed in claim 10, wherein the composition is a varnish, paint, electrophotographic toner, electrophotographic developer or inkjet ink.

* * * * *